(12) United States Patent
Kamma (10) Patent No.: US 11,335,030 B2
(45) Date of Patent: May 17, 2022

(54) CAMERA-CALIBRATION SYSTEM AND METHOD THEREOF

(71) Applicant: MANDO CORPORATION, Pyeongtaek-si (KR)

(72) Inventor: Rajesh Kumar Kamma, Haryana (IN)

(73) Assignee: Mando Mobility Solutions Corporation, Pyeongtaek-si (KR)

(*) Notice: Subject to any disclaimer, the term of this patent is extended or adjusted under 35 U.S.C. 154(b) by 270 days.

(21) Appl. No.: 16/860,635

(22) Filed: Apr. 28, 2020

(65) Prior Publication Data

US 2020/0349738 A1   Nov. 5, 2020

(30) Foreign Application Priority Data

Apr. 30, 2019 (KR) .................. 10-2019-0050313

(51) Int. Cl.
*G06T 7/80* (2017.01)
*H04N 17/00* (2006.01)

(52) U.S. Cl.
CPC ............. *G06T 7/85* (2017.01); *H04N 17/002* (2013.01); *G06T 2207/30208* (2013.01); *G06T 2207/30252* (2013.01)

(58) Field of Classification Search
CPC ............. G06T 7/85; G06T 2207/30208; G06T 2207/30252; H04N 17/002
See application file for complete search history.

(56) References Cited

U.S. PATENT DOCUMENTS

| | | | |
|---|---|---|---|
| 8,537,199 B2* | 9/2013 | Shimizu | G06T 7/80 348/148 |
| 9,311,706 B2* | 4/2016 | Natroshvili | G06T 7/85 |
| 9,491,451 B2* | 11/2016 | Pliefke | H04N 17/002 |
| 9,646,212 B2 | 5/2017 | Zhang et al. | |
| 9,688,200 B2* | 6/2017 | Knudsen | B60R 1/00 |
| 9,723,272 B2* | 8/2017 | Lu | H04N 7/181 |
| 9,965,870 B2* | 5/2018 | Claveau | G06T 7/80 |
| 9,978,146 B2* | 5/2018 | Hedi | G06T 7/80 |
| 10,733,761 B2* | 8/2020 | Kroeger | G06T 7/80 |
| 10,868,974 B2* | 12/2020 | Lu | H04N 5/23238 |
| 11,268,947 B2* | 3/2022 | Hsu | G01N 1/2806 |

(Continued)

*Primary Examiner* — Manav Seth
(74) *Attorney, Agent, or Firm* — Morgan, Lewis & Bockius LLP (57) ABSTRACT

A camera calibration system according to an exemplary embodiment includes a first camera capturing the surroundings of a vehicle; a second camera capturing the surroundings of the vehicle and having an overlapping field of view that overlaps with a field of view of the first camera; and a controller configured to receive a first image obtained by the first camera and a second image obtained by the second camera, detect a plurality of calibration markers positioned in the overlapping field of view in the first image and assign a tag to each of the plurality of calibration markers detected in the first image, detect a plurality of calibrate markers positioned in the overlapping field of view in the second image and assign a tag to each of the plurality of calibrate markers detected in the second image, and calibrate the field of view of at least one of the first camera and the second camera based on the tag assigned to each of the plurality of calibration markers detected in the first image and the tag assigned to each of the plurality of calibration markers detected in the second image.

14 Claims, 8 Drawing Sheets

(56) References Cited

U.S. PATENT DOCUMENTS

| | | | | |
|---|---|---|---|---|
| 2011/0115922 | A1* | 5/2011 | Shimizu | G06T 7/80 |
| | | | | 348/188 |
| 2012/0287232 | A1* | 11/2012 | Natroshvili | G06T 7/33 |
| | | | | 348/36 |
| 2014/0098229 | A1* | 4/2014 | Lu | H04N 7/181 |
| | | | | 348/148 |
| 2016/0176343 | A1* | 6/2016 | Sakano | G06T 7/60 |
| | | | | 348/148 |
| 2019/0147623 | A1* | 5/2019 | Tsuchiya | G06T 3/4038 |
| | | | | 702/85 |
| 2021/0190922 | A1* | 6/2021 | Yu | G01S 15/931 |
| 2021/0339686 | A1* | 11/2021 | Koller | B60R 1/00 |
| 2022/0067972 | A1* | 3/2022 | Momcilovic | G06T 7/80 |

\* cited by examiner

CAMERA-CALIBRATION SYSTEM AND METHOD THEREOF

CROSS-REFERENCE TO RELATED APPLICATION(S)

The present application claims priority to and the benefit of Korean Patent Application No. 10-2019-0050313, filed on Apr. 30, 2019 which is incorporated herein by reference in its entirety.

1. TECHNICAL FIELD

Apparatuses and methods consistent with exemplary embodiments relate to a camera-calibration system and method thereof, more specifically, relate to a camera-calibration system and method thereof wherein the camera is installed on an object such as a vehicle to capture a surroundings of the object.

2. BACKGROUND

In modern society, vehicles are the most common means of transportation, and the number of people using them is increasing.

Due to the development of vehicle technology, it is easy to move long distance and make life easier. However, in countries with high population densities such as Korea, road traffic conditions worsen and traffic congestion frequently occurs.

Recently, vehicles with Advanced Driver Assist System (ADAS), which actively provide information on the vehicle status, driver status, and surrounding environment, to relieve the burden on the driver and to enhance convenience. Research is actively underway.

Examples of advanced driver assistance systems mounted on a vehicle include a forward collision avoidance system (FCA), an autonomous emergency brake (AEB), and a driver attention warning system (DAW). Such a system is a system for determining a collision risk with an object in a driving situation of a vehicle and providing collision avoidance and warning through emergency braking in a collision situation.

The vehicle means a device capable of carrying a person or object to a destination while driving on a road or a track. The vehicle can be moved to various positions, mainly using one or more wheels installed on the vehicle body. Such a vehicle may be a three- or four-wheeled vehicle, a two-wheeled vehicle such as a motorcycle, a construction machine, a bicycle, and a train traveling on a rail disposed on a track.

Such a system is not limited to an object called a vehicle, but may be applied to various objects such as airplanes, helicopters, and drones. To apply such a system to various objects, a camera is installed on the object in order to acquire information of object's surroundings. There is an increasing demand to obtain information of object's surroundings.

In general, at least two cameras are required to acquire a field of view close to 360 degrees with respect to the object. However, when two cameras are used, there may exist an area that is not captured by any camera, and thus, a blind spot that cannot be captured by the camera may exist, and thus information about the surroundings of the object may not be obtained completely.

Therefore, two or more plurality of cameras may be installed on the object, and in order to minimize blind spots, the plurality of cameras may be installed with overlapping field of views, and in order to calibrate the plurality of cameras in which the field of views overlap, correct calibration system is required.

In the prior art, manual intervention was required to calibrate a plurality of cameras, and there is a problem that it takes a lot of time as a manual intervention is required, and a system for automatically calibrating a plurality of cameras is required.

SUMMARY

It is an aspect of one or more exemplary embodiments to provide a system for calibrating a plurality of cameras for capturing a surroundings of an object, such as a vehicle, to automatically calibrate a plurality of cameras by using calibration objects in overlapping field of views of the plurality of cameras.

Additional aspects of the exemplary embodiments will be set forth in part in the description which follows and, in part, will be obvious from the description, or may be learned by practice of the exemplary embodiments.

According to an aspect of an exemplary embodiment, there is provided a camera calibration system including a first camera capturing the surroundings of a vehicle; a second camera capturing the surroundings of the vehicle and having an overlapping field of view that overlaps with a field of view of the first camera; and a controller configured to receive a first image obtained by the first camera and a second image obtained by the second camera, detect a plurality of calibration markers positioned in the overlapping field of view in the first image and assign a tag to each of the plurality of calibration markers detected in the first image, detect a plurality of calibrate markers positioned in the overlapping field of view in the second image and assign a tag to each of the plurality of calibrate markers detected in the second image, and calibrate the field of view of at least one of the first camera and the second camera based on the tag assigned to each of the plurality of calibration markers detected in the first image and the tag assigned to each of the plurality of calibration markers detected in the second image.

The controller is further configured to detect a plurality of classification markers positioned in the overlapping field of view in the first image and determine an x-axis direction and a y-axis direction of the first image based on the plurality of classification markers detected in the first image, and detect a plurality of classification markers positioned in the overlapping field of view in the second image and determine an x-axis direction and a y-axis direction of the second image based on the plurality of classification markers detected in the second image.

The controller is further configured to determine a first calibration marker as a reference marker for assigning a tag to each of the plurality of calibrate markers detected in the first image based on position and angle of at least one of the plurality of calibration markers or a plurality of classification markers detected in the first image, and determine a second calibration marker as a reference marker for assigning a tag to each of the plurality of calibrate markers detected in the second image based on position and angle of at least one of the plurality of calibration markers or a plurality of classification markers detected in the second image.

The controller is further configured to assign an x-axis direction tag and a y-axis direction tag to each of the plurality of calibration markers detected in the first image based on the determined first calibration marker, and assign an x-axis direction tag and a y-axis direction tag to each of the plurality of calibration markers detected in the second image based on the determined second calibration marker.

The controller is configured to calibrate the field of view of at least one of the first camera and the second camera by comparing positions of the tags assigned to each of the plurality of calibration markers detected in the first image with positions of the tags assigned to each of the plurality of calibration markers detected in the second image.

The controller is configured to determine vertexes of checkerboard pattern positioned in the overlapping field of view as the plurality of the classification markers.

The controller is configured to determine a center point of circles positioned in the overlapping field of view as the plurality of calibration markers.

According to an aspect of another exemplary embodiment, there is provided a camera calibration method including: acquiring a first image captured by a first camera and a second image captured by a second camera, the second camera having an overlapping field of view that overlaps with a field of view of the first camera; detecting a plurality of calibration markers positioned in the overlapping field of view in the first image; assigning a tag to each of the plurality of calibration markers detected in the first image; detecting a plurality of calibrate markers positioned in the overlapping field of view in the second image; assigning a tag to each of the plurality of calibration markers detected in the second image; and calibrating the field of view of at least one of the first camera and the second camera based on the tag assigned to each of the plurality of calibration markers detected in the first image and the tag assigned to each of the plurality of calibration markers detected in the second image.

The vehicle control method may further include: detecting a plurality of classification markers positioned in the overlapping field of view in the first image; determining an x-axis direction and a y-axis direction of the first image based on the plurality of classification markers detected in the first image; detecting a plurality of classification markers positioned in the overlapping field of view in the second image; and determining an x-axis direction and a y-axis direction of the second image based on the plurality of classification markers detected in the second image.

The vehicle control method may further include: determining a first calibration marker as a reference marker for assigning a tag to each of the plurality of calibrate markers detected in the first image based on position and angle of at least one of the plurality of calibration markers or a plurality of classification markers detected in the first image; and determining a second calibration marker as a reference marker for assigning a tag to each of the plurality of calibrate markers detected in the second image based on position and angle of at least one of the plurality of calibration markers or a plurality of classification markers detected in the second image.

The assigning of the tag to each of the plurality of calibration markers detected in the first image may include: assigning an x-axis direction tag and a y-axis direction tag to each of the plurality of calibration markers detected in the first image based on the determined first calibration marker, and assigning of the tag to each of the plurality of calibration markers detected in the second image may include: assigning an x-axis direction tag and a y-axis direction tag to each of the plurality of calibration markers detected in the second image based on the determined second calibration marker.

The calibrating of the field of view of at least one of the first camera and the second camera may include calibrating the field of view of at least one of the first camera and the second camera by comparing positions of the tags assigned to each of the plurality of calibration markers detected in the first image with positions of the tags assigned to each of the plurality of calibration markers detected in the second image.

The detecting of the plurality of classification markers positioned in the overlapping field of view may include determining vertexes of checkerboard pattern positioned in the overlapping field of view as the plurality of the classification markers.

The detecting of the plurality of calibration markers positioned in the overlapping field of view in the first image may include determining a center point of circles positioned in the overlapping field of view as the plurality of calibration markers.

BRIEF DESCRIPTION OF THE DRAWINGS

These above and/or other aspects of the disclosure will become apparent and more readily appreciated from the following description of exemplary embodiments, taken in conjunction with the accompanying drawings in which.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, hereinafter, exemplary embodiments will now be described more fully with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting. As used herein, the singular forms "a," "an," and "the" are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

Figure 1:
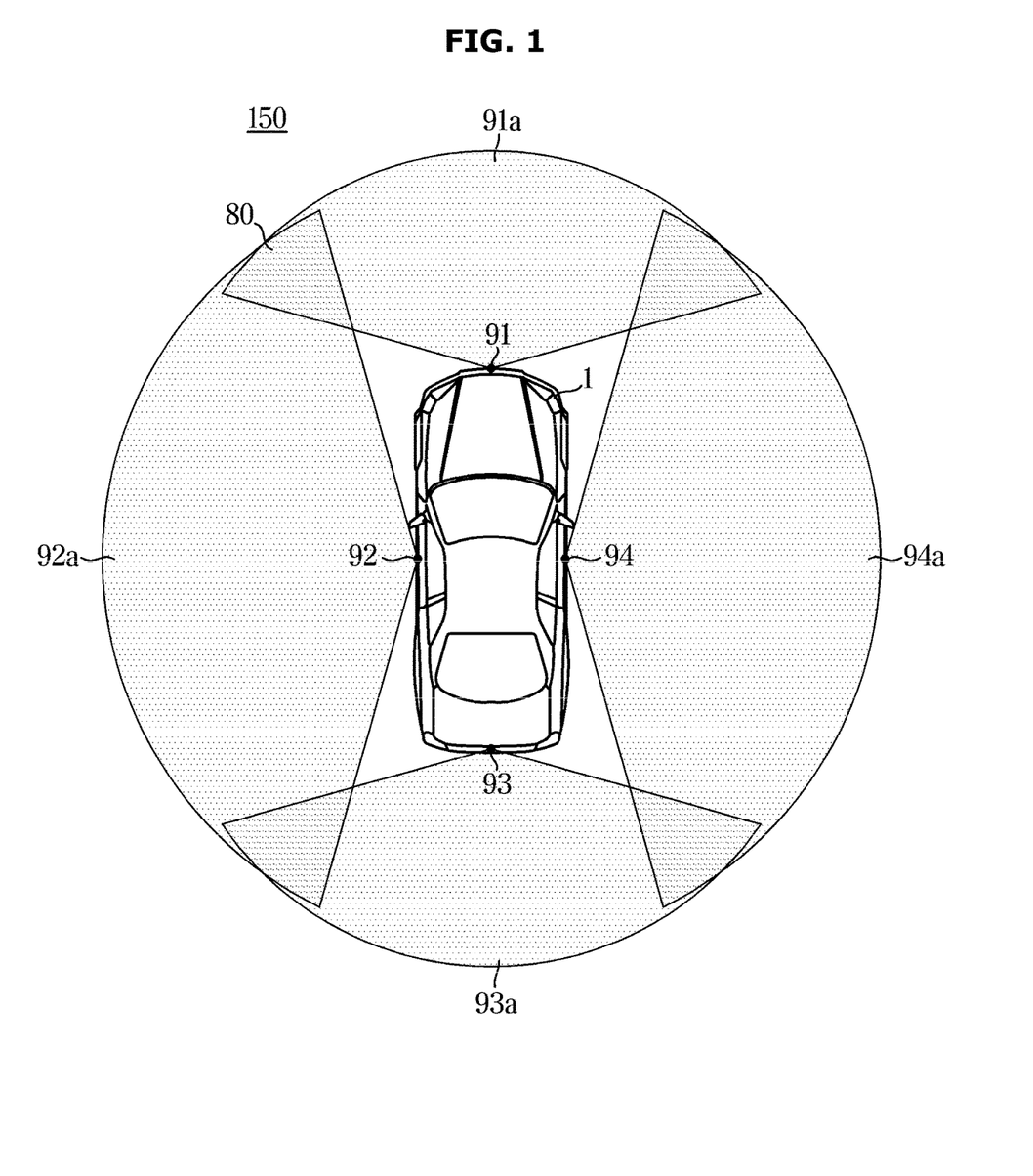
FIG. 1 schematically illustrates an exterior of a vehicle to which a camera calibration system according to an embodiment of the present disclosure is applied.

FIG. 1 is a control configuration diagram of a camera calibration system according to an embodiment of the present disclosure.

Referring to FIG. 1, a vehicle 1 according to an embodiment of the present disclosure may include a plurality of cameras 90 capturing surroundings of the vehicle 1.

The plurality of cameras 90 can be replaced or combined with radars that emit electromagnetic waves and receives echo waves reflected from the target object to identify the object and detect its position, moving speed, etc., or lidars that emit laser and measure the physical properties such as distance, concentration, speed, shape, etc. of the object to be measured from the time of arrival, intensity, frequency, and polarization state of the laser.

In addition, the plurality of cameras 90 may be interpreted as including all devices capable of capturing an image, without being limited to the term.

The vehicle 1 may include a plurality of electrical components. For example, the vehicle 1 may include an engine management system (EMS), a transmission control unit (TCU), an electronic brake control module, and an electronic steering device. Power Steering (EPS), a Body Control Module (BCM), and a Driver Assistance System (DAS) may be further included.

The plurality of cameras 90 include a front camera 91 mounted on the front of the vehicle 1 to capture images of an area in front of the vehicle 1, a left camera 92 mounted on the left side of the vehicle 1 to capture images of an area of the left side of the vehicle 1, rear camera 93 mounted on the rear side of the vehicle 1 to capture images of an area of the rear side of the vehicle 1 and a right camera 94 mounted on the right side of the vehicle 1 to capture images of an area of the right side of the vehicle 1.

Although not shown in FIG. 1, the plurality of cameras 90 may be mounted on the vehicle 1 to have a field of view of left-front side of the vehicle which is between the left side and the front of the vehicle 1 (hereinafter, left-front side), and to have a field of view of right-front side of the vehicle which is between the right side and the front of the vehicle 1 (hereinafter, right-front side). It may be provided anywhere in the surroundings of the vehicle 1 so as to capture an image of an object located in any directions.

The plurality of cameras 90 may include a plurality of lenses and an image sensor. The image sensor may include a plurality of photodiodes for converting light into an electrical signal, and the plurality of photodiodes may be arranged in a two-dimensional matrix.

The lens used in the plurality of cameras 90 may be a normal lens, a wide-angle lens having a larger viewing angle than the normal lens, or a fisheye lens which is an ultra wide-angle lens having a viewing angle greater than 180 degrees.

As shown in FIG. 1, the front camera 91 may capture an image of the front field of view 91a to acquire an image of the front field of view 91a, the left camera 92 may capture an image of the left field of view 92a to acquire an image of the left field of view 92a, the rear camera 93 may capture an image of the rear field of view 93a to acquire an image of the rear field of view 93a, and the right camera 94 may capture an image of the right field of view 94a to acquire an image of the right field of view 94a.

In this case, there may be an overlapping field of view 80 which is an area where the front field of view 91a and the left field of view 92a overlap. The overlapping field of view 80 is not limited to an area where the front field of view 91a and the left field of view 92a overlap each other, but may include the area where the front field of view 91a and the right field of view 94a overlap, the area where the right field of view 94a and the rear field of view 93a overlap, and the area where the rear field of view 93a and the left field of view 92a overlap.

Of course, since the plurality of cameras 90 may be mounted on the vehicle 1 to have a field of view of left-front side of the vehicle, and to have a field of view of right-front side of the vehicle, the overlapping field of view 80 may be interpreted to mean all areas where fields of views of the plurality of cameras 90 overlap each other.

As described below, the vehicle 1 to which the camera calibration system 150 is applied may transmit a plurality of images captured by the plurality of cameras 90 to the controller 100.

Figure 2:
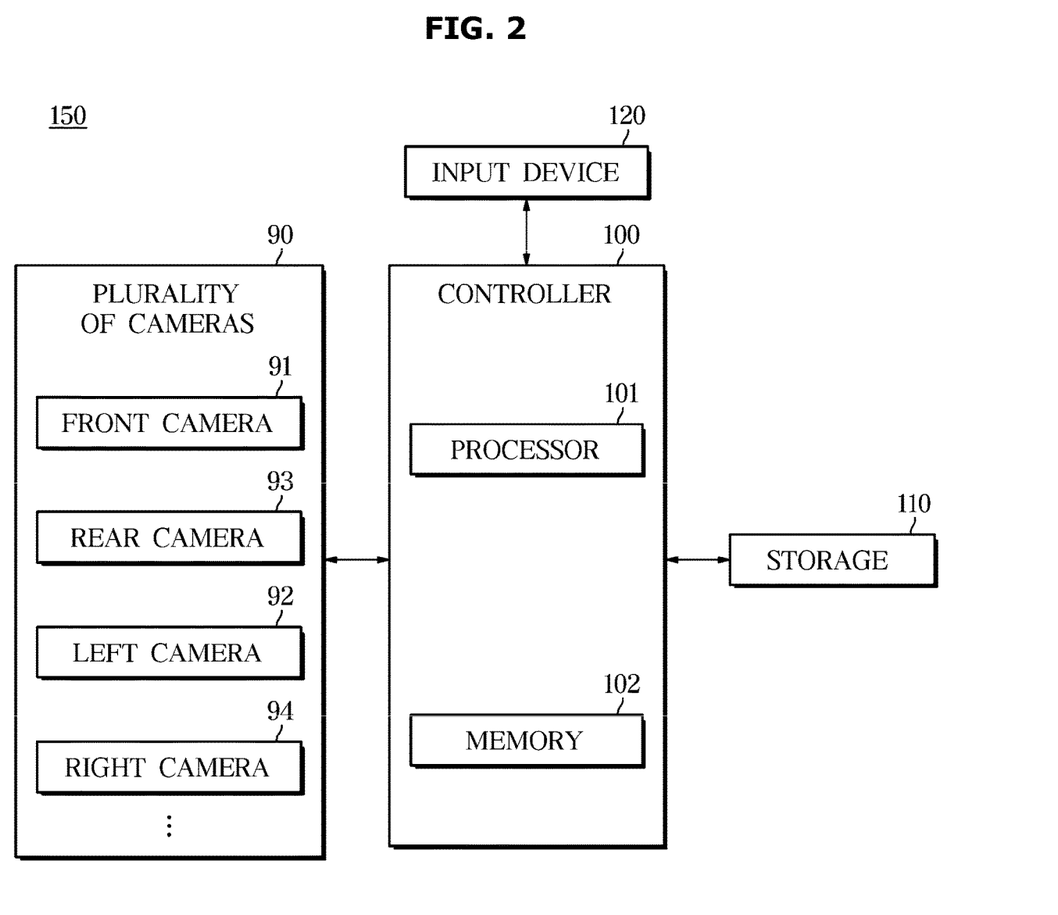
FIG. 2 is a block diagram of a camera calibration system according to one embodiment of the present disclosure.

FIG. 2 is a block diagram of a camera calibration system according to one embodiment of the present disclosure.

Referring to FIG. 2, a camera calibration system 150 may include a plurality of cameras 90, including a front camera 91, a left camera 92, a rear camera 93, and a right camera 94, the controller 100 for calibrating the plurality of cameras 90 based on the image received from the plurality of camera 90, the input device 120 for inputting various commands related to the camera calibration system 150 and a storage 110 capable of storing data such as various algorithms related to camera calibration.

As described above with reference to FIG. 1, the plurality of cameras 90 may be mounted on the vehicle 1 to capture an image of the surroundings of the vehicle 1 and may have an overlapping field of view 80.

The vehicle and control method thereof according to an exemplary embodiment of the present invention can induce and maximize the positive emotion of the users by determining the positivity of the users in the vehicle, accumulating the positivity index based on the positivity, and rewarding the users when the positivity index reaches the target positivity index.

In addition, the plurality of cameras 90 may be electrically connected to a controller 100. For example, the plurality of cameras 90 may be connected to the controller 100 through a communication network NT for the vehicle 1, connected to the controller 100 through a hard wire, or connected to the controller 100 through a printed circuit board (PCB).

The plurality of cameras 90 may transmit an image obtained by capturing the surroundings of the vehicle 1 to the controller 100.

As described below with reference to FIG. 3, at least one of a plurality of calibration markers or a plurality of classification markers may be positioned in the overlapping field of view 80 of the plurality of cameras 90.

The controller 100 may include a processor 101 and a memory 102.

The processor 101 may receive images acquired by the plurality of cameras 90 and determine the overlapping field of view 80 based on the acquired images.

In addition, the processor 101 may generate a signal for calibrating the plurality of cameras 90 based on the acquired image. For example, the processor 101 may include an image processor for processing image data acquired by a plurality of cameras 90 and/or a digital signal processor and/or Micro Control Unit (MCU) for calibrating cameras 90.

The processor 101 may detect at least one of a plurality of calibration markers or a plurality of classification markers positioned in the overlapping field of view 80 based on image data acquired by the plurality of cameras 90.

That is, the processor 101 may detect a plurality of calibration markers positioned in an overlapping field of view 80 of image data acquired by a plurality of cameras 90. Multiple classification markers can be detected by the processor 101.

The processor 101 may detect the positions of the plurality of calibration markers and detect the positions of the plurality of classification markers.

In detail, the processor 101 may detect at least one of a plurality of calibration markers and a plurality of division markers by applying a method such as an edge detection algorithm in the acquired image.

The processor 101 may determine the coordinates of vertexes if the markers are rectangular shape, or determine the coordinates of center of the circle if the markers are circular shape.

In addition, the processor 101 may assign a unique tag to each of a plurality of calibration markers. The tag may be assigned in an element form of the matrix, the tag in the x-axis direction may be a row portion of the matrix, and the tag in the y-axis direction may be a column portion of the matrix. For example, a calibration marker that is a reference marker to tag assignment of a plurality of calibration markers may be assigned a tag of (1,1), and the processor may determine the calibration marker assigned a tag of (1,1) as an origin calibration marker.

The processor 101 may determine the x-axis direction and the y-axis direction of an image based on at least one of a plurality of detected calibration markers and a plurality of classification markers, and determine an origin calibration marker assigned a tag of (1,1).

In addition, the processor 101 assigns a plurality of calibration markers a tag in order of (1,2), (1,3), . . . , (1,n) and assigns a plurality of calibration markers a tag in order of (2,1), (3,1), . . . , (m,1) based on the determined x-axis direction, y-axis direction and the origin calibration marker assigned a tag of (1,1). (n is the number of elements of the columns of the plurality of calibration markers, m is the number of elements of the rows of the plurality of calibration markers)

When the processor 101 assigns a tag to all of the plurality of calibration markers, as described below with reference to FIG. 3, the processor 101 generates a signal for calibrating a field of view of the plurality of cameras 90 based on the assigned tags and transmits the signal to the plurality of cameras 90.

Memory 102 may store algorithms and/or programs and/or data for the processor 101 to detect a plurality of calibration markers and/or a plurality of classification markers based on the images acquired by the plurality of cameras 90, to assign tags to a plurality of calibration markers, and to generate a signal for calibrating a field of views of the plurality of cameras 90.

The memory 102 may temporarily store image data acquired by the plurality of cameras 90, and temporarily store image data processing results of the processor 101.

The memory 102 may be a flash memory, a read only memory (ROM), an erasable programmable read only memory (EPROM), or the like, as well as a volatile memory such as an S-RAM or a D-RAM.

The input device 120 may be provided for inputting various commands related to the camera calibration system 150. The input device 120 may be implemented as a physical button, a knob, a touch pad, a touch screen, a stick operation device or a trackball. The input device 120 may be omitted in some embodiments.

Storage 110 may store algorithms and/or programs and/or data for the processor 101 to detect a plurality of calibration markers and/or a plurality of classification markers based on the images acquired by the plurality of cameras 90, to assign tags to a plurality of calibration markers, and to generate a signal for calibrating a field of views of the plurality of cameras 90.

The storage 110 may be a nonvolatile memory device or a RAM, such as a cache, a read only memory (ROM), a programmable ROM (PROM), an erasable programmable ROM (EPROM), an electrically erasable programmable ROM (EEPROM), and a flash memory. It may be implemented as at least one of a volatile memory device such as a random access memory or a storage medium such as a hard disk drive (HDD) or a CD-ROM. The storage 110 may be a memory implemented as a separate chip from the processor 101 described above with respect to the controller 100, or may be implemented as a single chip separated with the processor 101.

Figure 3:
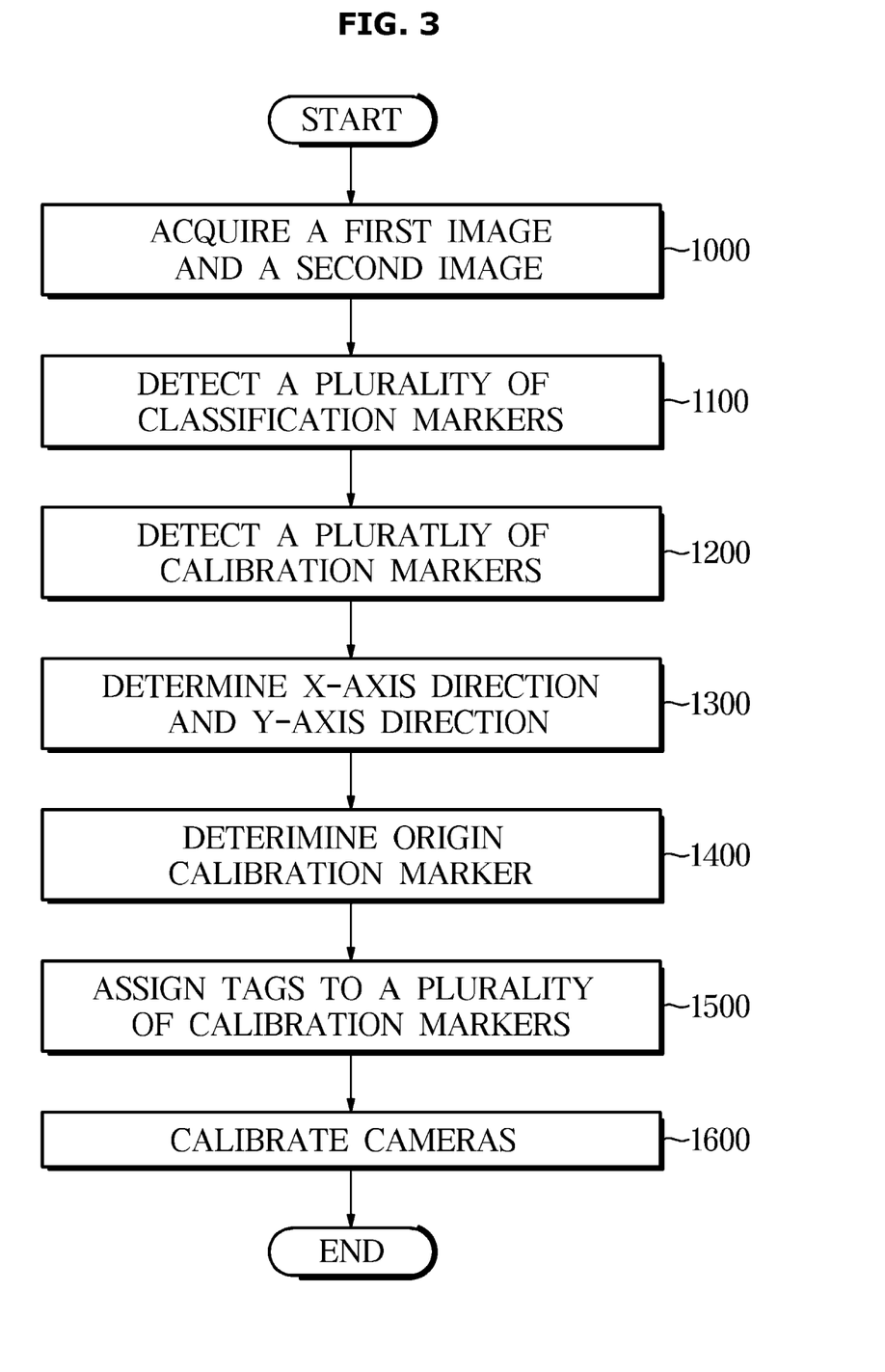
FIG. 3 is a flowchart illustrating a camera calibration method according to an embodiment of the present disclosure.

FIG. 3 is a flowchart illustrating a camera calibration method according to an embodiment of the present disclosure.

Figure 4:
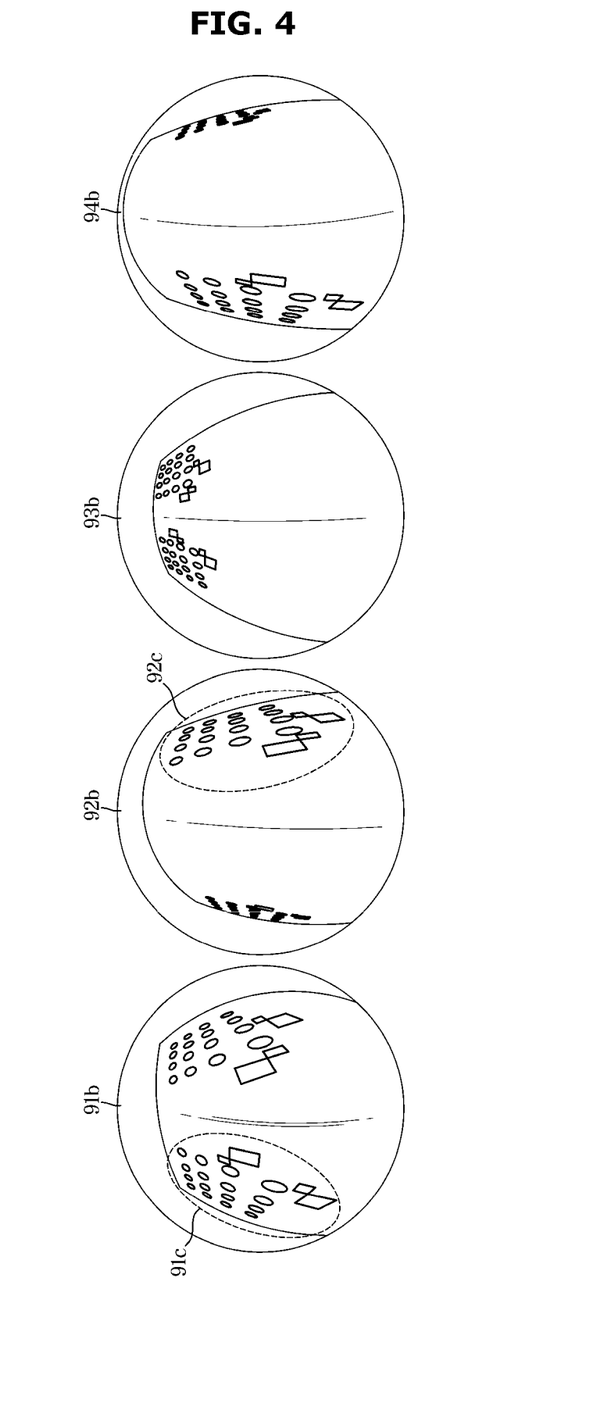
FIG. 4 illustrates an image acquired by cameras of a camera calibration system according to an exemplary embodiment of the present disclosure.

FIG. 4 illustrates an image acquired by cameras of a camera calibration system according to an exemplary embodiment of the present disclosure.

Figure 5A:
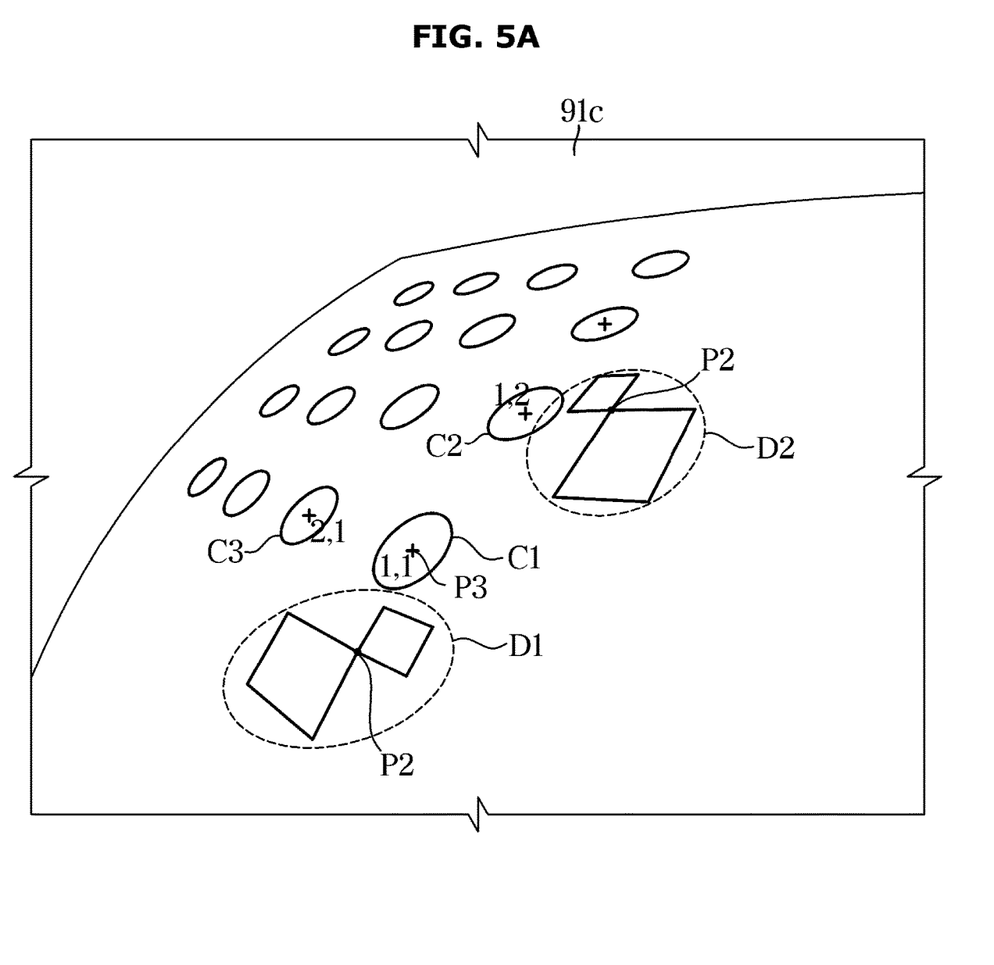
FIG. 5a illustrates a left-side area of an image acquired by a front camera of a camera calibration system according to an exemplary embodiment of the present disclosure.

FIG. 5a illustrates a left-side area of an image acquired by a front camera of a camera calibration system according to an exemplary embodiment of the present disclosure.

Figure 5B:
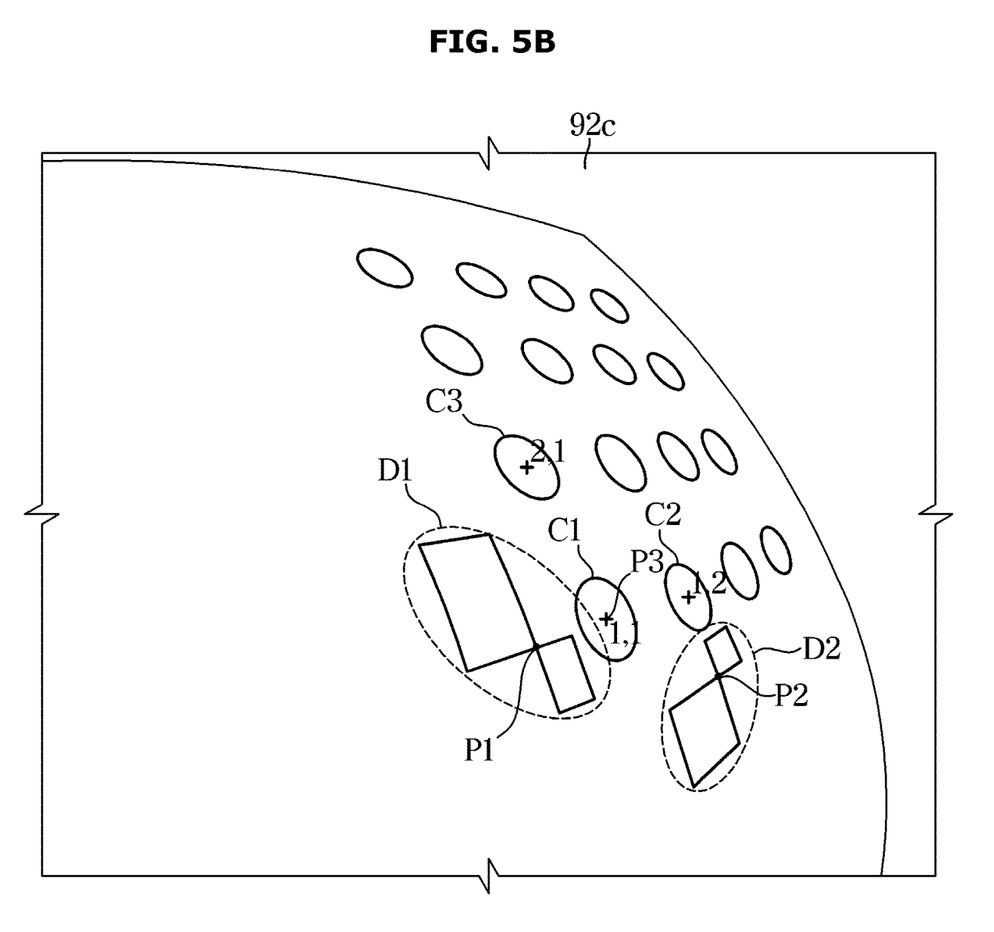
FIG. 5b illustrates a right-side area of an image acquired by a left camera of a camera calibration system according to an exemplary embodiment of the present disclosure.

FIG. 5b illustrates a right-side area of an image acquired by a left camera of a camera calibration system according to an exemplary embodiment of the present disclosure.

Figure 6A:
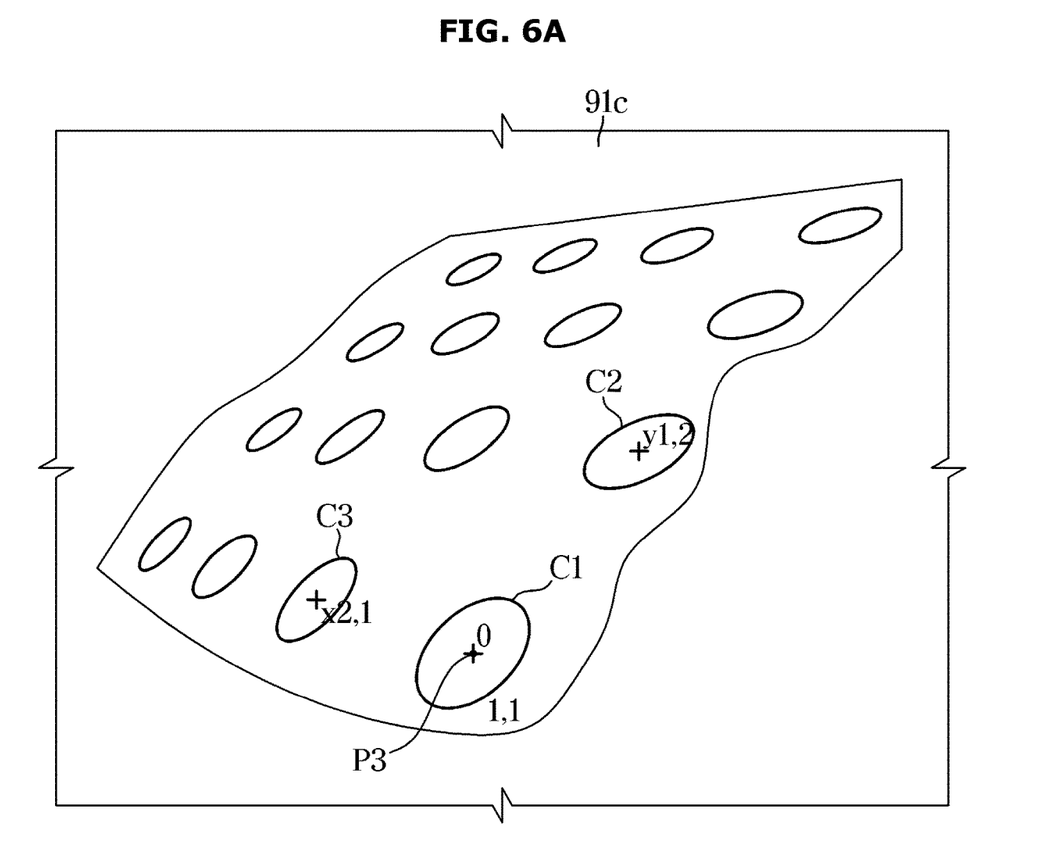
FIG. 6a illustrates a left-side area of an image acquired by a front camera of a camera calibration system according to an exemplary embodiment of the present disclosure.

FIG. 6a illustrates a left-side area of an image acquired by a front camera of a camera calibration system according to an exemplary embodiment of the present disclosure.

Figure 6B:
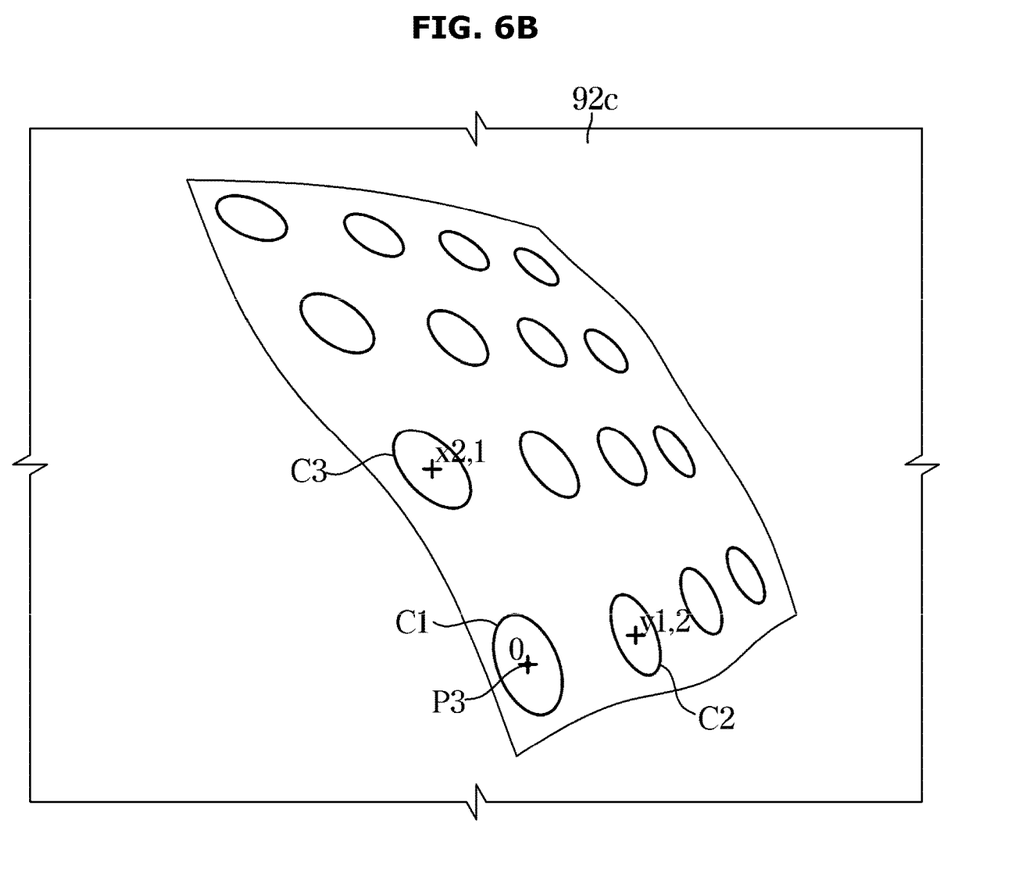
FIG. 6b illustrates a right-side area of an image acquired by a left camera of a camera calibration system according to an exemplary embodiment of the present disclosure.

FIG. 6b illustrates a right-side area of an image acquired by a left camera of a camera calibration system according to an exemplary embodiment of the present disclosure.

Hereinafter, FIG. 3 will be described with reference to FIGS. 4 to 6.

As shown in FIG. 3, the camera calibration system 150 acquires a first image and a second image, which are images obtained by two cameras among the plurality of cameras 90 having an overlapping field of view 80 (1000).

FIG. 4 illustrates images obtained by a plurality of cameras 90, the images including the image 91b acquired by the front camera 91 capturing the image of an area of front field of view 91a, the image 94b acquired by the right camera 94 capturing the image of an area of right field of view 94a, the image 93b acquired by the rear camera 93 capturing the image of an area of rear field of view 93a, and the image 92b acquired by the left camera 92 capturing the image of an area of left field of view 92a The first image and the second image are images obtained by capturing two cameras having an overlapping field of view 80. For example, the first image may be the image 91b obtained by the front camera 91 capturing the front field of view 91a and the second image may be the image 92b obtained by the left camera 92 capturing the left field of view 92a.

Any images acquired by a plurality of cameras 90 having an overlapping field of view 80 may be a first image and a second image. For example, the first image may be the image 91b obtained by the front camera 91 capturing the front field of view 91a and the second image may be the image 94b obtained by the right camera 94 capturing the right field of view 94a. For convenience of description, let us assume that the first image is the image 91b obtained by the front camera 91 and the second image is the image 92a obtained by the left camera 92.

Referring back to FIG. 3, the camera calibration system 150 may detect a plurality of calibration markers positioned in the overlapping field of view 80 in the acquired first image and the second image and may detect a plurality of calibration markers (1100 and 1200).

FIG. 5a illustrates a plurality of calibration markers and a plurality of classification markers positioned in an overlapping field of view 91c in a first image 91b obtained by a front camera 91. FIG. 5b illustrates a plurality of calibration markers and a plurality of classification markers positioned in an overlapping field of view 92c in the second image 92b obtained by a left camera 92.

The plurality of classification markers may be checkerboard pattern and the checkerboard pattern may be 2×2. The plurality of calibration markers may be circular to be spaced apart by a predetermined distance. The camera calibration system 150 may determine and detect a checkerboard pattern positioned in the overlapping fields of view 80, 91c, and 92c as a plurality of classification markers. Also, the camera calibration system 150 may determine and detect a circles positioned in the overlapping fields of view 80, 91c, and 92c as a plurality of classification markers.

In detail, the camera calibration system 150 may detect at least one of a plurality of calibration markers or a plurality of classification markers by using a method such as an edge detection algorithm in the acquired image. For example, if the shape of each marker is a rectangle, it is possible to determine the specific location coordinates where the corners are located. If the shape of each marker is circular, it is possible to detect each marker by determining the coordinates of the specific location where the center of the circle is located.

Referring to FIGS. 5a to 5b, the camera calibration system 150 may detect a plurality of calibration markers by determining the coordinates P3 of a specific position where the center of the circle of the plurality of calibration markers formed in a circle is located. Also, the camera calibration system 150 may detect a plurality of classification markers by determining specific position coordinates P1 to P2 at which corners of each rectangle of the plurality of classification markers formed of a checkerboard pattern are located.

Referring back to FIG. 3, the camera calibration system 150 may determine an x-axis direction and a y-axis direction of the first image and the second image (1300), and determine a first calibration marker and a second calibration marker which is the origin calibration markers used as a reference for tag assignment (1400).

Referring to FIGS. 5a through 5b, the camera calibration system 150 may determine the origin calibration markers, an x-axis direction and a y-axis direction based on position coordinates of a plurality of detected calibration markers and a plurality of classification markers.

That is, the origin calibration markers, the x-axis direction and the y-axis direction may be determined based on the corner points P1 and P2 of the plurality of classification markers, and based on the L2-norm and the angle based on the position coordinates of the plurality of calibration markers.

The camera calibration system 150 may determine origin calibration markers by calculating the angles and sizes of the line connecting position coordinates of the plurality of classification markers, and the line connecting position coordinates of the plurality of calibration markers.

For example, a calibration marker surrounded by two calibration markers C2 and C3 and one classification marker D1 may be determined as an origin calibration marker C1. Also, the direction in which the calibration marker C2 surrounded by three calibration markers and one classification marker D2 may be determined as the y-axis direction based on the origin calibration marker C1.

The algorithm for determining the directions of the x-axis and y-axis and the origin calibration marker is not limited to the above example, but include any algorithms using the angle and distance between each detected plurality of calibration markers and the plurality of classification markers.

Referring back to FIG. 3, the camera calibration system 150 may assign tags to the plurality of calibration markers after determining the x-axis direction, the y-axis direction and the origin calibration markers of the first and second images (1500).

Referring to FIGS. 5a through 5b, tags may be assigned in an element form of a matrix, tags in the x-axis direction may be row parts of the matrix, and tags in the y-axis direction may be column parts of the matrix.

In other words, the processor 101 may generate a 2-D Cartesian coordinates based on the determined x-axis direction, y-axis direction, L2-norm of the plurality of calibration markers, and vector angle of the plurality of calibration markers, and may assign tags to the plurality of calibration markers in the generated Cartesian coordinates.

The origin calibration marker C1, which is a reference for tag assignment of a plurality of calibration markers, may be assigned a tag of (1,1). Tags in order of (1,2), (1,3), . . . , (1,n) may be assigned to the plurality of calibration markers located adjacent to the y-axis direction relative to the origin calibration marker C1 and tags in order of (2,1), (3,1), . . . , (m,1) may be assigned to the plurality of calibration markers located adjacent to the x-axis direction relative to the origin calibration marker C1. (n is the number of elements of the columns of the plurality of calibration markers, m is the number of elements of the rows of the plurality of calibration markers)

If a tag is assigned to a plurality of calibration markers located in each row and column, the processor 101 may assign the tags in order of (2,2), (3,2), . . . , (m,2) with the reference of the calibration marker C2 assigned a tag of (1,2). This process can be repeated to assign tags to all of the plurality of calibration markers.

The method and order of assigning tags to a plurality of calibration markers are not limited to the above and can be freely set.

FIG. 6a illustrates a plurality of calibration markers positioned in the overlapping fields of view 80 and 91c detected in the first image which is obtained by the front camera 91, and illustrates tags assigned to each of the plurality of calibration markers. FIG. 6b illustrates a plurality of calibration markers positioned in the overlapping fields of view 80 and 91c detected in the second image which is obtained by the left camera 92, and illustrates tags assigned to each of the plurality of calibration markers.

Looking at the assigned tag, the x-axis direction and the y-axis direction of the first image and the second image, the same calibration marker actually has the same tag regardless of whether the image is the first image or the second image.

That is, the origin calibration marker C1, the calibration marker C2 in the y-axis direction, and the calibration marker C3 in the x-axis direction in the overlapping field of view 91c of the first image obtained by the front camera 91 are same with the origin calibration marker C1, the calibration marker C2 in the y-axis direction, and the calibration marker C3 in the x-axis direction in the overlapping field of view 92c of the second image obtained by the left camera 92.

Referring back to FIG. 3, the camera calibration system 150 may calibrate the field of view of at least one of the first camera, which is front camera 91 for above explanation, and the second camera, which is left camera 92 for above explanation, based on the tag assigned to each of the plurality of calibration markers detected in the first image, obtained by the front camera 91, and the tag assigned to each of the plurality of calibration markers detected in the second image, obtained by the left camera 92 (1600).

Internal parameters of the camera include optical center, aspect ratio, projection type, and focal length. The aspect ratio and focal length can be obtained from the image sensor's data sheet and the optical center may be recognized as the center of the lens circle or the ellipse of the captured image.

A pin-hole camera model or a Tsai model can also be used for camera calibration, but not limited to any model/algorithm for camera calibration.

In addition, an optimization algorithm can be used when rotating or moving the camera field of view, wherein the optimization algorithm includes any one of Particle Swarm Optimization (PSO), Ant Colony Optimization (ACO), Sevenberg-Marquardt (LM), and Least Mean Square (LMS).

Exemplary embodiments of the present disclosure have been described above. In the exemplary embodiments described above, some components may be implemented as a "module." Here, the term 'module' means, but is not limited to, a software and/or hardware component, such as a Field Programmable Gate Array (FPGA) or Application Specific Integrated Circuit (ASIC), which performs certain tasks. The module may advantageously be configured to reside on an addressable storage medium and configured to execute on one or more processors.

Thus, the module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any of the above described exemplary embodiments. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memory (CD-ROM), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A camera calibration system:
   a first camera capturing the surroundings of a vehicle;
   a second camera capturing the surroundings of the vehicle and having an overlapping field of view that overlaps with a field of view of the first camera; and
   a controller configured to:
   receive a first image obtained by the first camera and a second image obtained by the second camera,
   detect a plurality of calibration markers positioned in the overlapping field of view in the first image and assign a tag to each of the plurality of calibration markers detected in the first image,
   detect a plurality of calibrate markers positioned in the overlapping field of view in the second image and assign a tag to each of the plurality of calibrate markers detected in the second image, and
   calibrate the field of view of at least one of the first camera and the second camera based on the tag assigned to each of the plurality of calibration markers detected in the first image and the tag assigned to each of the plurality of calibration markers detected in the second image.

2. The camera calibration system according to claim 1, wherein:
   the controller is further configured to:
   detect a plurality of classification markers positioned in the overlapping field of view in the first image and determine an x-axis direction and a y-axis direction of the first image based on the plurality of classification markers detected in the first image, and
   detect a plurality of classification markers positioned in the overlapping field of view in the second image and determine an x-axis direction and a y-axis direction of the second image based on the plurality of classification markers detected in the second image.

3. The camera calibration system according to claim 2, wherein:
the controller is further configured to:
determine a first calibration marker as a reference marker for assigning a tag to each of the plurality of calibrate markers detected in the first image based on position and angle of at least one of the plurality of calibration markers or a plurality of classification markers detected in the first image, and
determine a second calibration marker as a reference marker for assigning a tag to each of the plurality of calibrate markers detected in the second image based on position and angle of at least one of the plurality of calibration markers or a plurality of classification markers detected in the second image.

4. The camera calibration system according to claim 3, wherein:
the controller is further configured to:
assign an x-axis direction tag and a y-axis direction tag to each of the plurality of calibration markers detected in the first image based on the determined first calibration marker, and
assign an x-axis direction tag and a y-axis direction tag to each of the plurality of calibration markers detected in the second image based on the determined second calibration marker.

5. The camera calibration system according to claim 1, wherein:
the controller is configured to calibrate the field of view of at least one of the first camera and the second camera by comparing positions of the tags assigned to each of the plurality of calibration markers detected in the first image with positions of the tags assigned to each of the plurality of calibration markers detected in the second image.

6. The camera calibration system according to claim 2, wherein:
the controller is configured to determine vertexes of checkerboard pattern positioned in the overlapping field of view as the plurality of the classification markers.

7. The camera calibration system according to claim 1, wherein:
the controller is configured to determine a center point of circles positioned in the overlapping field of view as the plurality of calibration markers.

8. The camera calibration method comprising:
acquiring a first image captured by a first camera and a second image captured by a second camera, the second camera having an overlapping field of view that overlaps with a field of view of the first camera;
detecting a plurality of calibration markers positioned in the overlapping field of view in the first image;
assigning a tag to each of the plurality of calibration markers detected in the first image;
detecting a plurality of calibrate markers positioned in the overlapping field of view in the second image;
assigning a tag to each of the plurality of calibration markers detected in the second image; and
calibrating the field of view of at least one of the first camera and the second camera based on the tag assigned to each of the plurality of calibration markers detected in the first image and the tag assigned to each of the plurality of calibration markers detected in the second image.

9. The camera calibration method according to claim 8, further comprising:
detecting a plurality of classification markers positioned in the overlapping field of view in the first image;
determining an x-axis direction and a y-axis direction of the first image based on the plurality of classification markers detected in the first image;
detecting a plurality of classification markers positioned in the overlapping field of view in the second image; and
determining an x-axis direction and a y-axis direction of the second image based on the plurality of classification markers detected in the second image.

10. The camera calibration method according to claim 9, further comprising:
determining a first calibration marker as a reference marker for assigning a tag to each of the plurality of calibrate markers detected in the first image based on position and angle of at least one of the plurality of calibration markers or a plurality of classification markers detected in the first image; and
determining a second calibration marker as a reference marker for assigning a tag to each of the plurality of calibrate markers detected in the second image based on position and angle of at least one of the plurality of calibration markers or a plurality of classification markers detected in the second image.

11. The camera calibration method according to claim 10, wherein:
assigning of the tag to each of the plurality of calibration markers detected in the first image comprising:
assigning an x-axis direction tag and a y-axis direction tag to each of the plurality of calibration markers detected in the first image based on the determined first calibration marker, and
assigning of the tag to each of the plurality of calibration markers detected in the second image comprising:
assigning an x-axis direction tag and a y-axis direction tag to each of the plurality of calibration markers detected in the second image based on the determined second calibration marker.

12. The camera calibration method according to claim 8, wherein:
calibrating of the field of view of at least one of the first camera and the second camera comprising:
calibrating the field of view of at least one of the first camera and the second camera by comparing positions of the tags assigned to each of the plurality of calibration markers detected in the first image with positions of the tags assigned to each of the plurality of calibration markers detected in the second image.

13. The camera calibration method according to claim 9, wherein:
detecting of the plurality of classification markers positioned in the overlapping field of view comprising:
determining vertexes of checkerboard pattern positioned in the overlapping field of view as the plurality of the classification markers.

14. The camera calibration method according to claim 8, wherein
detecting of the plurality of calibration markers positioned in the overlapping field of view in the first image comprising:
determining a center point of circles positioned in the overlapping field of view as the plurality of calibration markers.

* * * * *